United States Patent [19]

Horn

[11] 3,970,343
[45] July 20, 1976

[54] SUNROOF STRUCTURE

[75] Inventor: Charles G. Horn, West Newton, Mass.

[73] Assignee: Aro Manufacturing Co., Inc., West Newton, Mass.

[22] Filed: Sept. 16, 1974

[21] Appl. No.: 506,736

[52] U.S. Cl. .............................. 296/137 E; 49/209; 49/449; 292/36
[51] Int. Cl.² ........................................ B60J 7/04
[58] Field of Search ........ 296/137 F, 137 G, 137 H, 296/137 E, 137 B; 49/449, 209, 276, 277, 278; 292/36, 7, 336

[56] References Cited
UNITED STATES PATENTS

| | | | |
|---|---|---|---|
| 2,482,429 | 9/1949 | Mobbs et al. | 296/137 F |
| 2,674,480 | 4/1954 | Vigmostad | 292/7 |
| 3,025,099 | 3/1962 | Werner | 296/137 F |
| 3,580,629 | 12/1968 | Heim | 296/137 E |
| 3,713,689 | 1/1973 | Podolan et al. | 296/137 B |

FOREIGN PATENTS OR APPLICATIONS

| | | | |
|---|---|---|---|
| 265,185 | 10/1963 | Australia | 296/137 E |
| 171,795 | 7/1952 | Austria | 296/137 F |
| 1,159,784 | 12/1963 | Germany | 296/137 E |
| 65,895 | 1/1950 | Netherlands | 296/137 F |

Primary Examiner—Robert J. Spar
Assistant Examiner—Donald W. Underwood
Attorney, Agent, or Firm—Wolf, Greenfield & Sacks

[57] ABSTRACT

The sunroof structure comprises a molded plastic frame preferably having a ribbed cross section for providing rigidity to the frame. The frame is suitably supported from the vehicle roof structure which has an opening aligned with a gasket for forming a peripheral seal between the vehicle metal roof and the sunroof which is preferably constructed of a plexiglass or acrylic material. The sunroof is manually slidable to cover or uncover the opening in the vehicle roof and is locked by means of a toggle arm arrangement when in its closed position. A lifter bar assembly is provided for locking and sealing the sliding sunroof. This assembly preferably pivots at the front end and includes a lifter link for lifting the roof into a tight closed position. When the lifter bar assembly is released, the lifter bar and sunroof disengage from the roof gasket and the sunroof can then be moved rearwardly.

12 Claims, 16 Drawing Figures

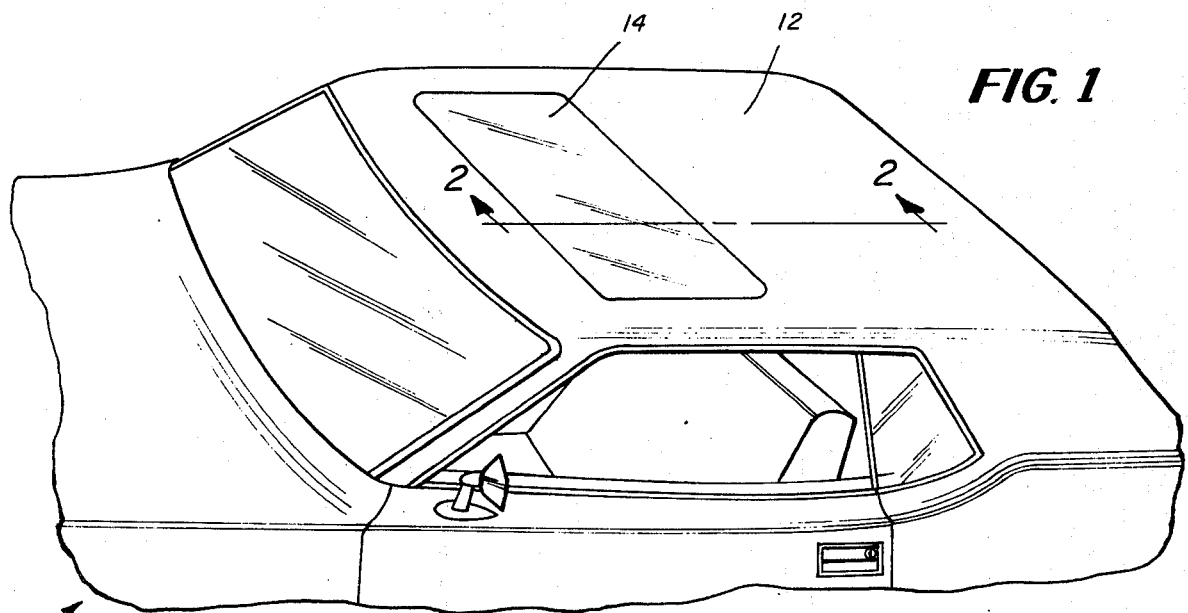
FIG. 1
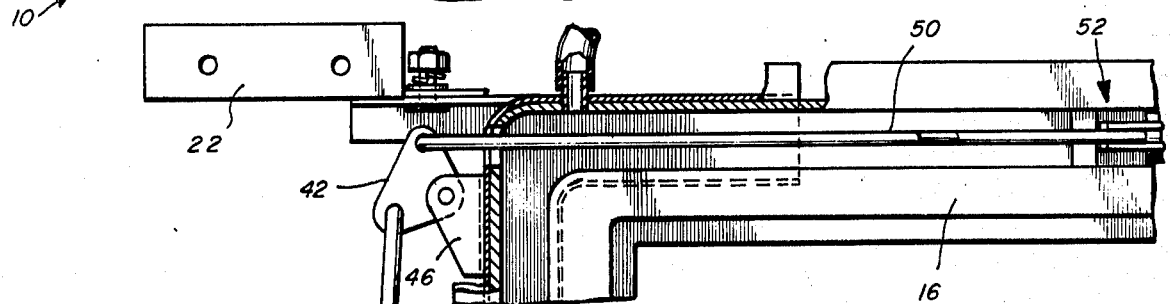
FIG. 4
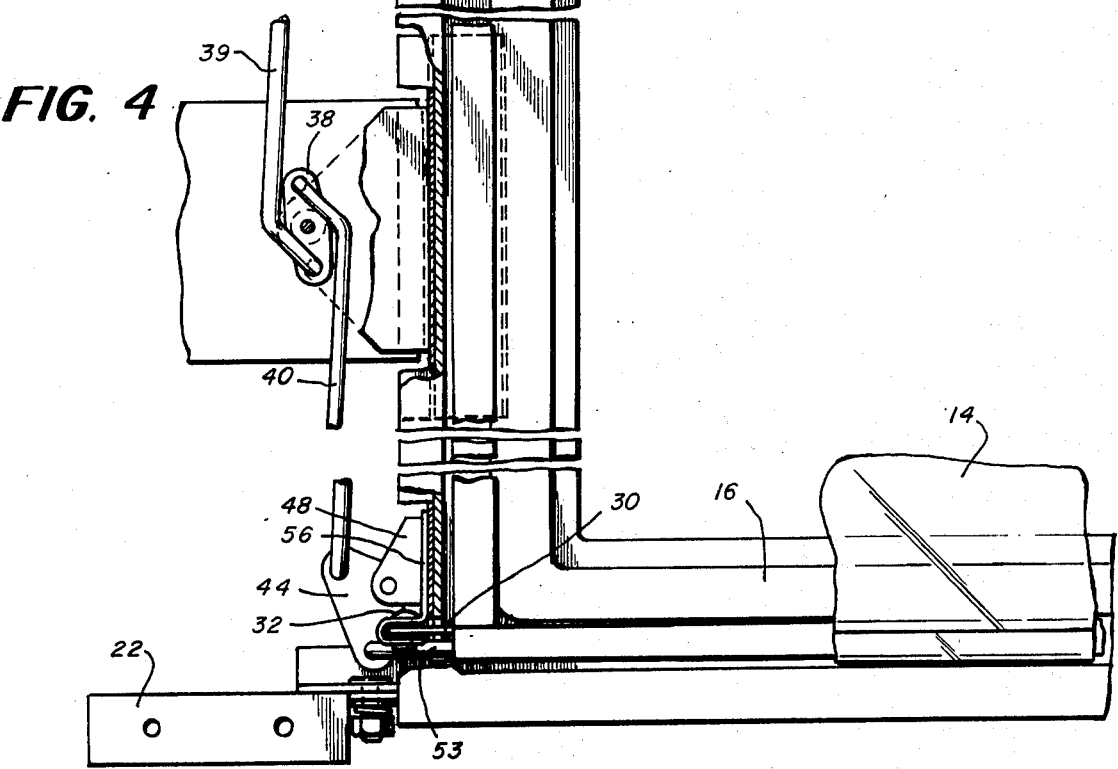

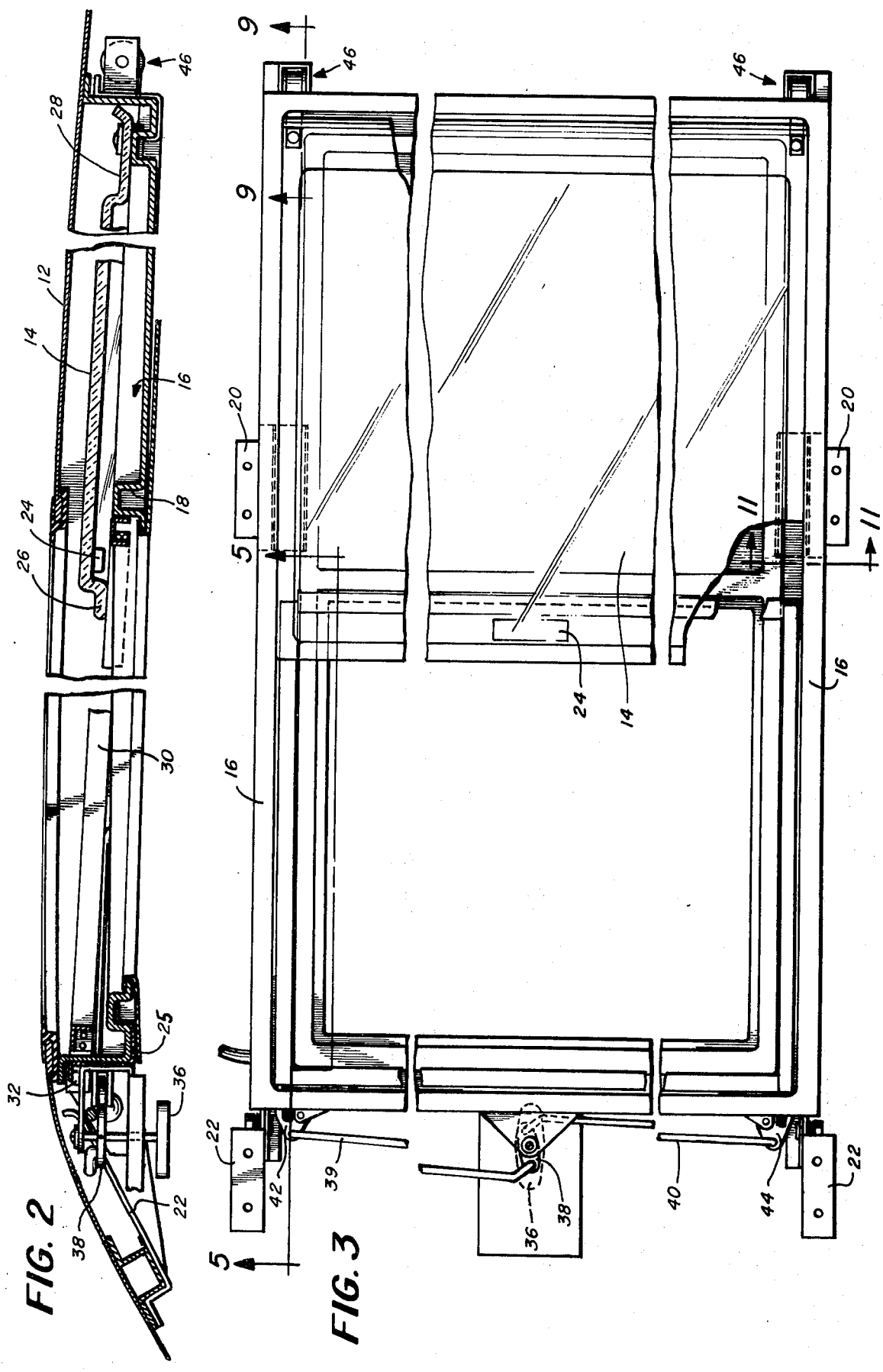

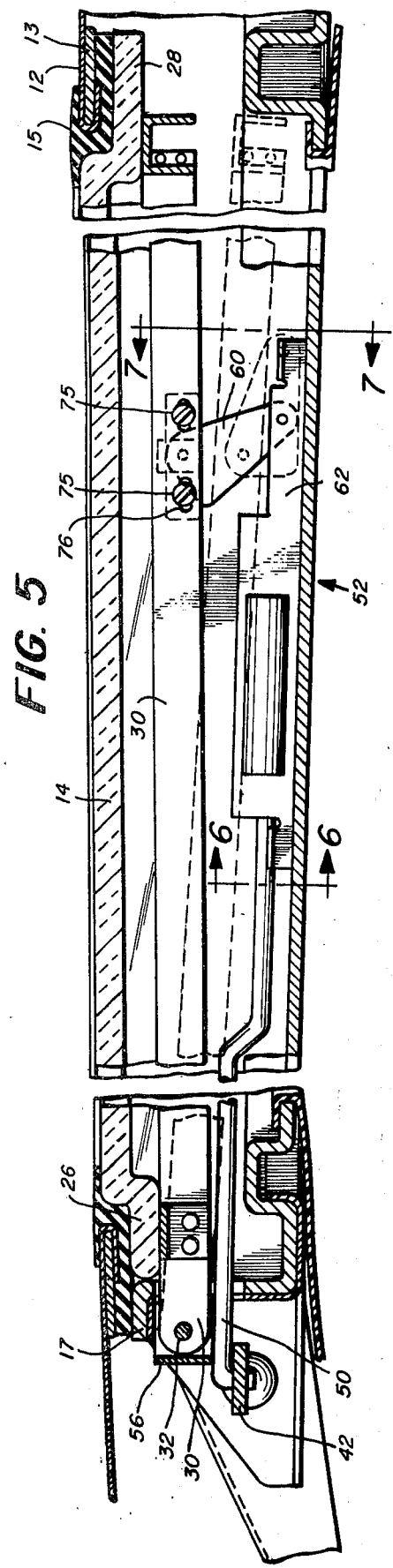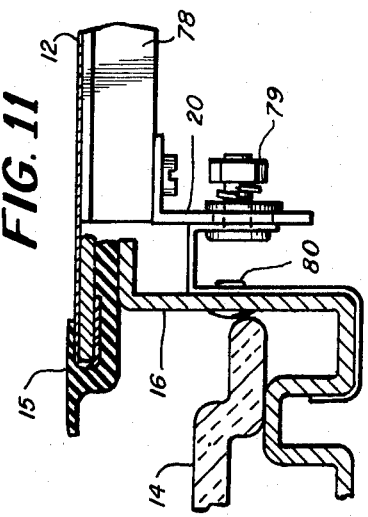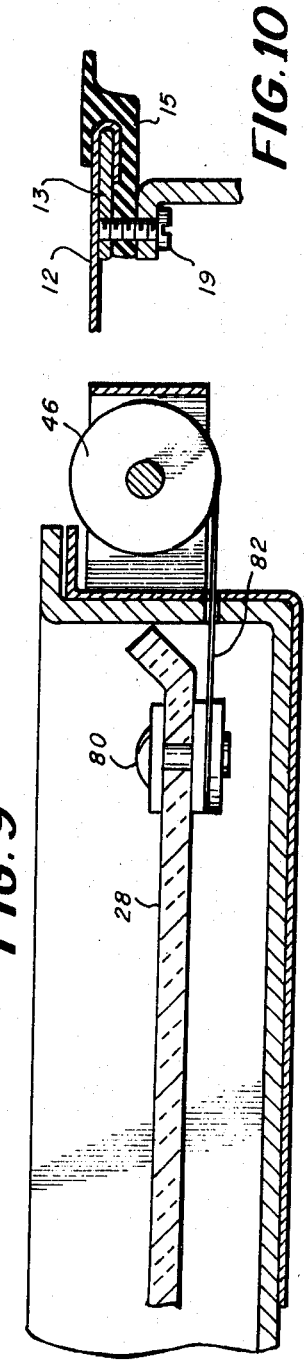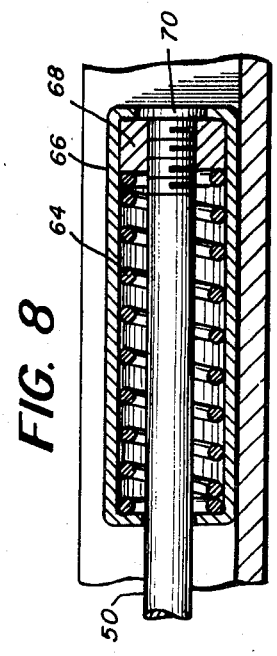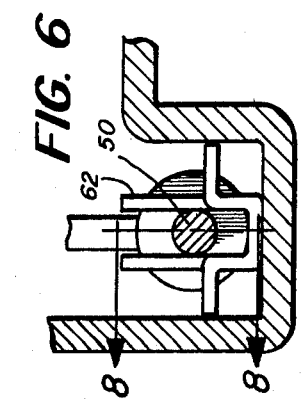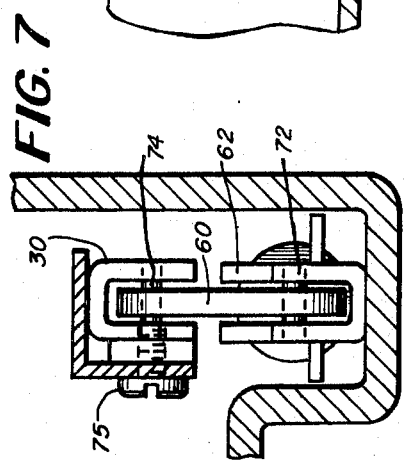

SUNROOF STRUCTURE

BACKGROUND OF THE INVENTION

The present invention relates, in general, to a sunroof structure and more particularly to a sunroof structure that is readily adaptable for use with different vehicles and that is easy to operate. The structure of the present invention has improved means for moving the sunroof to a sealed closed position.

Accordingly, it is an object of the present invention to provide an improved sunroof structure.

A further object of the present invention is to provide a novel apparatus for lifting the sunroof into its closed position and sealing the sunroof in that position.

A further object of the present invention is to provide a sunroof structure having a frame that is yieldable to be thereby adaptable to different types of roof structures.

Still another object of the present invention is to provide a sunroof structure wherein the sunroof cannot be locked unless it is moved to its closed position.

Still a further object of the present invention is to provide a sunroof structure wherein the sunroof is preferably constructed of a plexiglass material having a stiffening ridge for sealing against the vehicle roof.

Another object of the present invention is to provide a sunroof structure that is relatively simple in design, light in weight, can be manufactured relatively inexpensively and that can be easily installed in existing vehicles.

SUMMARY OF THE INVENTION

To accomplish the foregoing and other objects of this invention there is provided a sunroof structure for use with a vehicle having a roof opening beneath which the structure is disposed. The structure comprises a yieldable plastic frame covering an area larger than the opening in the vehicle roof and extending rearwardly of the roof opening, a sunroof panel slidable within the frame and having means attached thereto for facilitating forward and rearward movement of the sunroof panel, a pair of lifter bar assemblies, one disposed in each guide channel of the frame, and means for actuating the lifter bar assembly to urge the sunroof panel against the opening.

The lifter bar assemblies preferably each comprise a lifter bar upon which the sunroof rests, means defining a fixed pivot for the bar at its front end, a slide bar preferably having a compression spring associated therewith, and a lifter link coupled intermediate the lifter bar and slide bar. The means for actuating the lifter bar assembly preferably comprises a toggle arm arrangement including a handle which can be rotated to move the slide bar forwardly thereby rotating the lifter link and causing the lifter bar to pivot upwardly and urge the sunroof panel against the opening.

Another important feature of the present invention is provided by means of a locking toggle arrangement including a limiting and interlocking cam. This toggle arrangement comprises a handle which is limited in its rotational movement and also comprises an interlocking cam which prevents the sealing of the sunroof unless the sunroof is completely slid to its closed position.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a perspective view of a vehicle showing the position of the sunroof structure;

FIG. 2 is a cross sectional view taken along line 2—2 of FIG. 1;

FIG. 3 is a plan view of the sunroof structure shown in FIG. 1;

FIG. 4 is an enlarged partially cross sectional view of a portion of the sunroof structure shown in FIG. 3;

FIG. 5 is a cross sectional view taken along line 5—5 of FIG. 3;

FIG. 6 is a cross sectional view taken along line 6—6 of FIG. 5;

FIG. 7 is a cross sectional view taken along line 7—7 of FIG. 5;

FIG. 8 is a cross sectional view taken along line 8—8 of FIG. 6;

FIG. 9 is a cross sectional view taken along line 9—9 of FIG. 3;

FIG. 10 is a partial cross sectional view showing one mode of connection of the sunroof structure to the vehicle roof;

FIG. 11 is a fragmentary cross sectional view taken along line 11—11 of FIG. 3;

DETAILED DESCRIPTION

Figure 12:
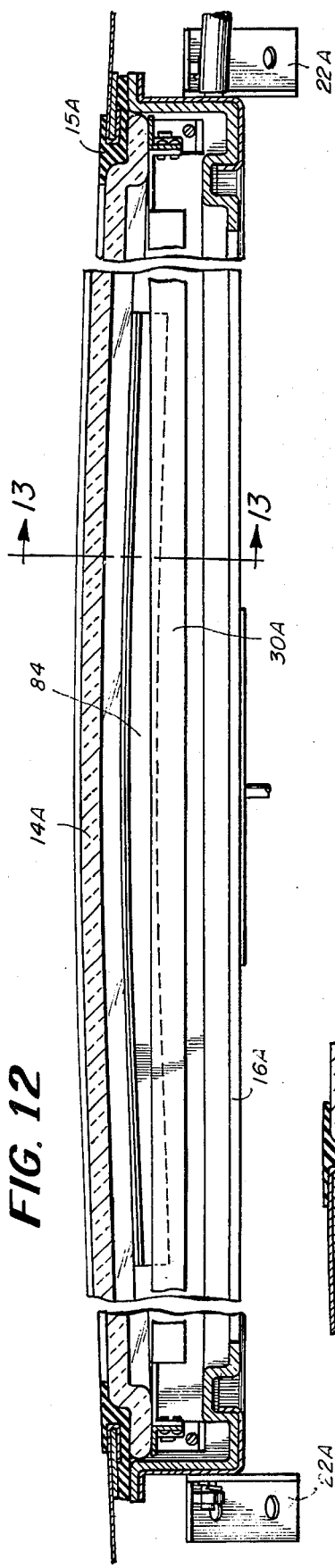
FIG. 12 is a cross sectional view in a forward direction for an alternate embodiment of the invention.

FIG. 1 shows the vehicle 10 having a roof 12 which is provided with an opening for receiving the sunroof structure 14 of the present invention.

FIG. 2 is a cross sectional view taken along line 2—2 of FIG. 1 showing the sunroof structure disposed below the vehicle roof 12. The sunroof structure comprises a frame 16 which is shown in a cross sectional view in FIG. 2 and in a plan view in FIG. 3. This frame 16 is preferably made of a plastic material so that it can yield to some extent, but does have re-enforcing ribs 18 for providing some rigidity to the frame. As shown in FIGS. 2 and 3, the frame 16 is mounted at its center by brackets 20 which are disposed at opposite sides of the frame. At the front of the frame there are provided brackets 22 which secure the front of the frame to the roof adjacent the top of the windshield. The brackets 22 connect to a second bracket 25 which, as shown in FIG. 2, couples underneath the front of the frame 16 and is secured thereto by suitable means.

FIGS. 2 and 3 also show the sunroof panel 14 which has a handle 24 at the front end thereof. The occupant of the vehicle may move the sunroof 14 forwardly and rearwardly using the handle 24. The sunroof 14 is preferably constructed of a plexiglass material which blocks the majority of the sun's rays when in the closed position. The sunroof 14 preferably has a flange 26 extending about at least three sides and a rear flange 28 which is shown and discussed in more detail hereinafter in FIG. 9.

FIG. 2 also shows the lifter bar 30 which pivots at fixed pivot pin 32 and extends rearwardly, as shown, with the sunroof 14 resting thereupon. Alternately, the pivot pin 32 may be adjustable so as to provide a secure seal with the gasket 15 (see FIG. 5). In the structure, there are two lifter bars 30 that support opposite sides of the sunroof. Also shown in FIGS. 2 and 3 is the locking mechanism which includes a handle 36 connecting to a toggle 38 from which arms 39 and 40 extend. The opposite ends of arm 39 and 40 extend to rotary links 42 and 44, respectively. This toggle arrangement is discussed in more detail hereinafter.

One other feature that may be incorporated into this apparatus is the retracting mechanism 46 which is mounted at the rear of the frame 16 and couples to the sunroof 14. This structure is shown in more detail and discussed hereinafter in FIG. 9. As indicated in FIG. 3, two of these mechanisms are used at opposite sides of the frame.

FIG. 4 is a plan view similar to that shown in FIG. 3 but with part of the frame cross sectioned to show more clearly the toggle arrangement of this invention. In FIG. 4 there is shown the toggle 38, arms 39 and 40 and pivot members 42 and 44. Brackets 46 and 48, respectively, fixedly support the members 42 and 44. As indicated in FIGS. 4 and 5, the member 42 has a rod 50 with a slight bend therein coupled thereto. The rod 50 connects at its other end to the lifter bar assembly 52. Similarly, a like rod 53 also couples from member 44 on the other side of the frame.

Mounted above the rod 50, as shown in FIG. 5, there is a bracket 56, one on each side of the frame. This bracket 56 is also shown in FIG. 4 and supports the pivot pin 32. The lifter bar 30 is pivoted from pin 32.

In FIG. 4 the toggle 38 is shown in its over center position corresponding to the solid position of lifter bar 30 in FIG. 5 with the sunroof in its locked and sealed position.

FIGS. 5 and 10 show the arrangement for the sealing between the sunroof 14 and the vehicle roof 12. In installing the structure of the present invention in a vehicle not having an accommodating opening, the roof 12 is cut open and then bent outwardly about a rectangular frame 13. A gasket 15 is provided against which the flanges 26 and 28 engage when in the closed position. The outer edge 17 of the frame 16 also fits against this gasket and as shown in FIG. 10, a bolt or screw 19 may be employed to secure these parts together, as shown. It has been found that the frame can be held suitably in contact with the gasket, however, simply by the mounting brackets shown in FIG. 3, including brackets 20 and 22.

As indicated in FIGS. 5–8, the lifter bar assembly 52 comprises lifter bar 30, linkage 60, slide bar 62 and compression spring 64. As indicated in FIG. 6, the rod 50 couples through the U-shaped slide bar 62 and has its end extending, as shown in FIG. 8, into tubular housing 66. Housing 66 contains spring 64 and has a nut 68 threaded to the end of rod 50 for permitting limited adjustment of the rod relative to the housing 66. An opening 70 is provided in the end of the housing for permitting this adjustment. The rear end of slide bar 62, as shown in FIG. 7, is also U-shaped and has the link 60 pivotally secured therebetween by means of a pin 72. The top of the link 60 is also secured by a pin 74 to the U-shaped lifter bar 30. FIG. 7 also shows an adjusting screw 75. There are actually two adjusting screws 75, as shown in FIG. 5, which are accommodated by slots 76 for permitting adjustment of the bar 30 in its closed position to allow for a tighter or looser fit, as desired. Actually, the seal should be as tight as possible and, in fact, one of the important features of the present invention is the concept of directly sealing the sunroof against the gasket.

FIG. 9 shows the end flange 28 of the sunroof which has a rivet 80 or the like for attachment to one end of a ribbon 82. This ribbon extends to retracting mechanism 46 which may be of conventional design and simply biases the ribbon 82 into the retracting mechanism 46 so that when the lifter bar assembly is lowered by movement of the rod 50 to the right, as viewed in FIG. 5, the sunroof 14 is assisted in its rearwood movement by these retracting mechanisms.

FIG. 11 shows one of the support brackets 20 for supporting the center section of the frame 16. The bracket 20 is supported from a frame work beam 78 normally present in a vehicle for supporting the roof 12. The position of the frame 16 may be adjustable by means of the bolt 79 associated with the bracket 20. The portion of the bracket 20 that extends about the frame 16 may be secured thereto by means of a rivet 80.

Figure 13:
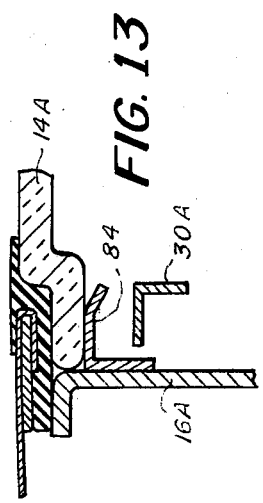
FIG. 13 is a fragmentary cross sectional view taken along line 13—13 of FIG. 12.

FIG. 12 is a cross sectional view looking forwardly of a slightly different embodiment of the invention wherein the sunroof 14A has a bowed configuration. In the position shown in FIG. 12 the sunroof 14A is secured against the gasket 15A in a closed position. FIG. 12 also shows the mounting brackets 22A and the frame 16A which is of generally the same configuration as the frame previously shown. As indicated in FIGS. 12 and 13 there is provided a centrally disposed support bracket 84 which is suitably secured to the frame 16A as shown in FIG. 13. This bracket 84 properly aligns the bowed center section of the sunroof. It is noted in FIG. 13 that this bracket is disposed at a slightly higher elevation than the slide bar 30A which is at the edges of the sunroof 14A.

Figure 14:
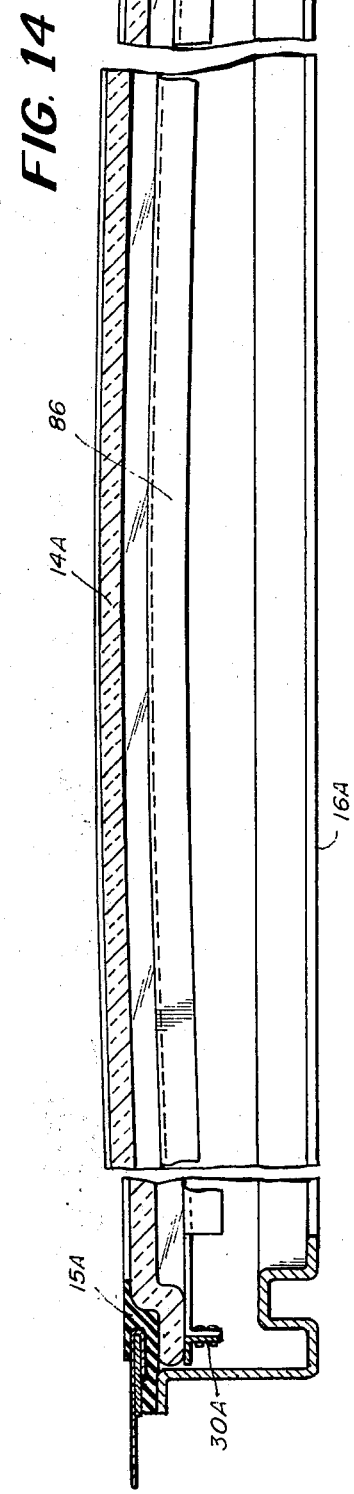
FIG. 14 is a cross sectional view of the embodiments shown in FIG. 12 looking rearwardly.

FIG. 14 shows a cross sectional view looking rearwardly and showing the frame 16A, gasket 15A, sunroof 14A and a bowed support member 86 which extends between the lifter bars 30A.

Figure 15:
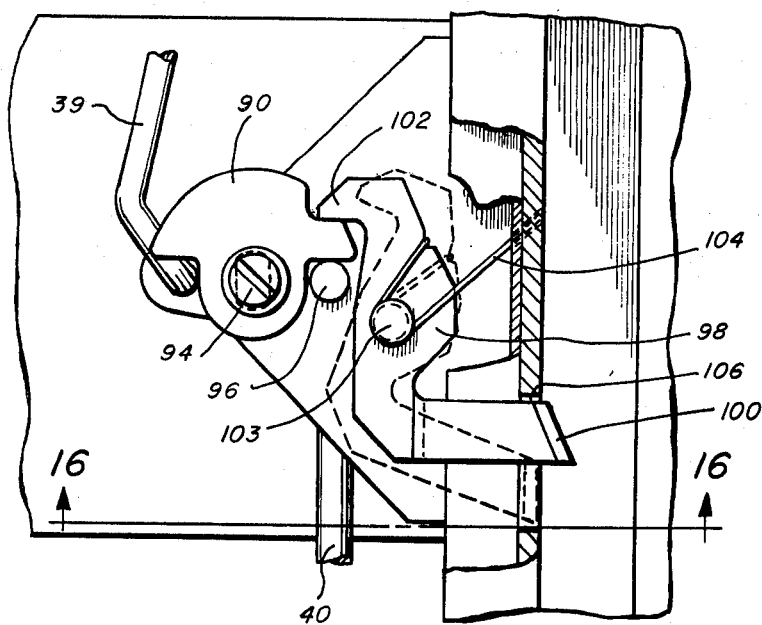
FIG. 15 is a partially cut-a-way plan view of a preferred closure toggle.
Figure 16:
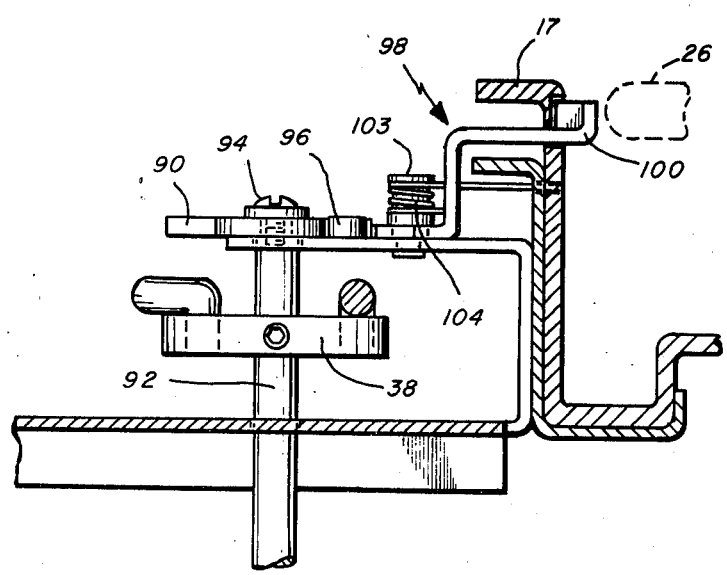
FIG. 16 is a cross sectional view taken along line 16—16 of FIG. 15.

FIG. 15 shows a partially cut-a-way preferred embodiment for the toggle arrangement. This replaces the toggle arrangement shown in FIG. 4. In FIGS. 15 and 16 there is shown a cam 90 fixedly supported from shaft 92. The other end or bottom end of shaft 92 couples to a handle like handle 36 shown in FIG. 2. A screw 94 is used to secure the cam 90 on the shaft 92. The shafts 92 and cam 90 are not relatively rotatable. The toggle plate 38 is also secured to shaft 92 and has the rods 39 and 40 extending therefrom as previously shown in FIG. 4. Upon rotation of the shaft 92 the plate 38 and cam 90 rotate therewith.

The supporting plate has a post 96 extending therefrom which functions as a stop for the cam 90. In the position shown in FIG. 15 the mechanism is in its open position and the latch 98 maintains the cam 90 in this unlocked position. An end lip 102 of the latch fits within a depression of the cam from maintaining it in this position. The spring 104 is supported about a post 103 and has an end engaging the latch 98 for maintaining it in the position shown in FIG. 15.

When the sunroof is closed, the sunroof engages with the end 100 of the latch which extends through the opening 106 in the frame and causes the latch to pivot about post 103. When that happens the end 102 disengages from the cam and the shaft 92 can then be rotated through approximately 180° causing operation of the rods 39 and 40 and actuation of the lifter assemblies associated therewith. Thus, with the arrangement shown in FIGS. 15 and 16, the cam 90 prevents rotation of the handle in the wrong direction and the safety latch prevents any damage occasioned by attempting to rotate the handle when the sunroof is not in its closed position. It is also noted that when the sunroof is in its locked position with reference to FIGS. 5 and 8, the coil spring is under tension providing the desired seal of the sunroof against the gasket.

What is claimed is:

1. A sunroof structure for a vehicle having a roof opening beneath which the structure is disposed, said structure comprising;
   a yieldable plastic frame covering an area larger than the opening in the vehicle roof and extending rearwardly of the roof opening, said frame having a cross-sectional configuration defining guide channels extending rearwardly along at least the sides of the frame,
   a sunroof panel slidable within the frame and having means attached thereto for facilitating forward and rearward movement of the sunroof panel,
   means disposed in each guide channel and each including a lifter bar upon which the panel rests, means defining a pivot for the bar at one end, and means for lifting the other end of the lifter bar,
   said lifting means comprising a link pivoted at one end from the lifter bar,
   and means for actuating the lifting means including a rod means extending along the guide channels and means coupling the rod means to an other end of the link to cause the lifter bar to pivot upwardly and urge the sunroof panel against the roof to cover the opening.

2. The sunroof structure of claim 1 including a gasket disposed between the sunroof panel and vehicle roof, said sunroof panel sealing tightly against the gasket and vehicle roof when closed.

3. The sunroof structure of claim 2 wherein said sunroof panel is bowed and has a peripheral edge flange engaging with the gasket.

4. The sunroof structure of claim 3 including a bowed cross piece extending between the rear ends of the lifter bars.

5. The sunroof structure of claim 4 including a guide piece for the sunroof panel attached to the front of the frame.

6. The sunroof structure of claim 1 wherein the means coupling the rod means to another end of the link comprises a slide bar accommodating the rod means at one end and receiving the link at the other end 7. The sunroof structure of claim 6 comprising a spring supported by the slide bar and fixed in position at one end relative to the slide bar, the other end of the spring being coupled to the rod means so that when the rod means is actuated the slide bar is maintained under spring tension.

8. The sunroof structure of claim 6 wherein the means for lifting includes a toggle structure operated by a handle and connected to the rod means for pulling the rod means to lift the lifter bar.

9. The sunroof structure of claim 8 including a toggle plate that is over-center in the locked position.

10. The sunroof structure of claim 1 including means for adjusting the position of the one end of the link relative to the lifter bar.

11. The sunroof structure of claim 1 including a retracting mechanism for drawing the sunroof panel rearwardly.

12. For a sunroof structure for a vehicle wherein the structure has lifter assemblies at opposite sides for sealing a sunroof against the vehicle roof, an apparatus for securing and unsecuring the sunroof to permit the sunroof to be either in a sealed closed position or slideable to an open position, said apparatus comprising,
   a handle,
   means coupled from and operable by the handle for operating the lifter assemblies,
   cam means operable by the handle to permit only limited rotation of the handle,
   latch means engagable with the cam means and having integral therewith a sunroof engaging edge for rotating said latch means when the sunroof is closed to permit rotation of the cam means,
   biasing means and a means for supporting the biasing means independent of the latch means,
   said cam means including means for receiving said latch means to maintain said cam means non-rotatable unless the sunroof is closed,
   said biasing means for biasing the latch means to a position wherein the cam means is non-rotatable until the sunroof directly contacts the engaging edge of the latch means,
   said latch means being rotatable against the bias of the biasing means upon direct engagement of the sunroof with the engaging edge of the latch means to thereby permit rotation of the cam means.

* * * * *